US011636755B2

(12) United States Patent
Reuel et al.

(10) Patent No.: US 11,636,755 B2
(45) Date of Patent: Apr. 25, 2023

(54) RESONANT SENSOR READER

(71) Applicant: Skroot Laboratory, Inc., Ames, IA (US)

(72) Inventors: Nigel F. Reuel, Ames, IA (US); Kyle Jackson, Winterset, IA (US); Charu Gupta, Ames, IA (US); Cameron Greenwalt, Kalamazoo, MI (US)

(73) Assignee: SKROOT LABOORATORY, INC., Ames, IA (US)

( * ) Notice: Subject to any disclaimer, the term of this patent is extended or adjusted under 35 U.S.C. 154(b) by 131 days.

(21) Appl. No.: 17/322,650

(22) Filed: May 17, 2021

(65) Prior Publication Data

US 2021/0366271 A1    Nov. 25, 2021

Related U.S. Application Data

(60) Provisional application No. 63/027,203, filed on May 19, 2020.

(51) Int. Cl.
*G08C 17/02* (2006.01)
*G06K 7/10* (2006.01)

(52) U.S. Cl.
CPC ......... *G08C 17/02* (2013.01); *G06K 7/10356* (2013.01)

(58) Field of Classification Search
CPC .............................. G06K 7/10356; G08C 17/02
USPC .......................... 235/435, 375, 487, 492, 439
See application file for complete search history.

(56) References Cited

U.S. PATENT DOCUMENTS

| 9,536,122 | B2 | 1/2017 | Potyrailo |
| 2007/0143162 | A1 | 6/2007 | Keever et al. |
| 2009/0121872 | A1 | 5/2009 | Lynch et al. |
| 2010/0030207 | A1 | 2/2010 | Hancock |
| 2010/0161004 | A1 | 6/2010 | Najafi et al. |
| 2015/0015275 | A1* | 1/2015 | Huang ................ G01M 5/0033 324/633 |

(Continued)

OTHER PUBLICATIONS

Bai W, Zhao K-S, Asami K (2006) Dielectric properties of *E. coli* cell as simulated by the three-shell spheroidal model. Biophysical chemistry, 122:136-42. https://doi.org/10.1016/j.bpc.2006.03.004.

(Continued)

*Primary Examiner* — Edwyn Labaze
(74) *Attorney, Agent, or Firm* — Goodhue, Coleman & Owens, P.C.

(57) ABSTRACT

A system for reading at least one wireless resonant sensor includes a signal parameter measuring device, a reader housing, a computing device electrically connected to the signal parameter measuring device, and a plurality of reader antennas disposed within the reader housing and electrically connected to the signal parameter measuring device, wherein the plurality of reader antennas comprises a first reader antenna for signal output and a second reader antenna for signal input. The signal parameter measuring device is configured to sweep frequencies over a range of frequencies to acquire signal parameters for the wireless resonant sensor. The computing device is configured to determine changes in resonant frequency of the wireless resonator sensor based on the signal parameters. The reader housing may be sized and shaped for placement against a surface of a vessel in which a chemical or biological process is occurring.

19 Claims, 19 Drawing Sheets

(56) References Cited

U.S. PATENT DOCUMENTS

| | | | |
|---|---|---|---|
| 2016/0125210 A1* | 5/2016 | Potyrailo | H04Q 9/00 340/10.1 |
| 2016/0143557 A1 | 5/2016 | Kahlman et al. | |
| 2017/0020415 A1 | 1/2017 | Scherer et al. | |
| 2017/0027424 A1 | 2/2017 | Ferren et al. | |
| 2017/0172583 A1 | 6/2017 | Wildgen et al. | |
| 2019/0117109 A1 | 4/2019 | Grundfest et al. | |
| 2020/0011811 A1* | 1/2020 | MacDonald | A61B 5/14532 |
| 2020/0129085 A1 | 4/2020 | Reuel et al. | |

OTHER PUBLICATIONS

Charkhabi, Sadaf et al., "Kirigami-Enabled, Passive Resonant Sensors for Wireless Deformation Monitoring", Advanced Materials Technologies 4(5), (2019), 1800683 (1-8).

Charkhabi, Sadaf et al., "Resonant Sensors for Low-Cost, Contact-Free Measurement of Hydrolytic Enzyme Activity in Closed Systems", ACS Sensors (3), 2018, 1489-1498.

Charkhabi, Sadaf et al., Resonant Sensor Arrays for Wireless Characterization of Solvated Ions, Articles, https://chemrxiv.org/articles/Resonant_Sensor_Arrays_for_Wireless_Characterization_of_Solvated_Ions/9595628/1, 34 pages.

Charkhabi, Sadaf et al., Resonant Sensor Arrays for Wireless Characterization of Solvated Ions, Articles, https://chemrxiv.org/articles/Resonant_Sensor_Arrays_for_Wireless_Characterization_of_Solvated_Ions/9595628/1, 24 pages.

Ong KG, Grimes CA, Robbins CL, Singh RS (2001) Design and application of a wireless, passive, resonant-circuit environmental monitoring sensor. Sensors and Actuators A: Physical, 93(1):33-43. https://doi.org/10.1016/S0924-4247(01)00624-0.

Volkmer B, Heinemann M (2011) Condition-Dependent Cell Volume and Concentration of *Escherichia coli* to Facilitate Data Conversion for Systems Biology Modeling. PLoS ONE, 6(7) 1-7, https://doi.org/10.1371/journal.pone.0023126.

International Search Report & Written Opinion, PCT/US21/32796, dated Sep. 29, 2021, 18 Pages.

* cited by examiner

RESONANT SENSOR READER

PRIORITY STATEMENT

This application claims priority to U.S. Provisional Patent Application No. 63/027,203, filed May 19, 2020, entitled Resonant Sensor Reader, hereby incorporated by reference in its entirety.

GRANT REFERENCE

This invention was made with government support under NSF1915860 and NSF2025552 awarded by the National Science Foundation (NSF). The government has certain rights in the invention.

FIELD OF THE INVENTION

The present invention relates to resonant sensors. More particularly, but not exclusively, the present invention relates to resonant sensor readers for use with wireless resonant sensors which may otherwise be known as LC sensors, LC tank sensors, or Chipless RFID.

BACKGROUND

Vector network analyzers (VNA) are commonly used to test network parameters of electrical networks and to test network component functionality. This is done by measuring a variety of different signals including s-parameters, y-parameters, h-parameters, and z-parameters, with s-parameters being the most commonly utilized due to the ease of measurement at high frequencies using transmission and reflection signals. FIG. 1 illustrates one example of a conventional VNA. Such technology has been used to test the operation of cables, antennas, filters, and amplifiers. Standard VNAs typically possess two ports allowing the measurement of four different s-parameters: S11, S21, S12, and S22. These s-parameters can provide information on the function and capabilities of various network components that operate using radio frequency (RF). VNAs are typically large, stand-alone devices that must be connected to a PC and display in order to collect the data and interpret. Thus, such large bulky devices cannot be deployed in tight situations. Additionally, they are frequently physically coupled to the device under test to improve signal. This is not possible with wireless resonant sensors that are integrated into a closed system. Optimized antennas are needed to couple with the resonator. Moreover, if one wants to interrogate a resonant sensor they would need to write custom automation code to periodically ping the resonant sensor. It is the purpose of this invention to provide a single, integrated device or system that can collect, assess, and record a changing resonant frequency of a wireless resonant sensor. This is to be applied to resonant sensors that have been used previously for applications such as, but not limited to, temperature[1], gas composition[2], deformation[3], ion[4], and biological sensing applications[5].

Therefore, what is needed is to provide a single, integrated device that can collect, assess, and record a changing resonant frequency.

SUMMARY

Therefore, it is a primary object, feature, or advantage of the present invention to improve over the state of the art.

It is a further object, feature, or advantage of the present invention to provide a resonant sensor reader which is a single, integrated device or system that can collect, assess, and record a changing resonant frequency.

It is a still further object, feature, or advantage of the present invention to provide a resonant sensor reader system for use with wireless resonant sensors which are integrated into closed systems.

Another object, feature, or advantage of the present invention is to provide a resonant sensor reader as a single integrated device or system which is easy and convenient to use, including by individuals not familiar with or accustomed to using signal testing equipment.

Yet another object, feature, or advantage is to provide a resonant sensor reader which is reliable for use in different environments.

A further object, feature, or advantage is to provide a resonant sensor reader which is relatively low in cost.

Another object, feature, or advantage is to provide a resonant sensor reader which can determine both a resonant frequency and a magnitude of transmission loss.

A still further object, feature, or advantage is to provide a resonant sensor reader that can be auto calibrated such that the output of the reader is directly actionable data supplied to the user on a display, via indicator light, or directly coupled to a controller (using 4-20 mA logic).

A further object, feature, or advantage is to provide a resonant sensor reader that can be auto calibrated so as to reject background noise.

A still further object, feature, or advantage is to provide a resonant sensor reader that may use a transfer function (such as provided by a calibration file) to translate change in resonant frequency or magnitude to physical parameters of interest such as, but not limited, temperature, flow rate, foaming, or other physical parameter.

Another object, feature, or advantage of the present invention is to provide a resonant sensor reader which may be used in applications such as temperature, gas composition, deformation, ion, and biological sensing applications.

Yet another object, feature, or advantage is to provide a resonant sensor reader which may be used with a wireless resonant sensor which may be integrated into various types of bioreactors including flasks, single-use bags, and bioreactors with windows.

A further object, feature, or advantage is to enable the reading of resonant sensors which are deployed in space constrained situations such as in a shake incubator, a closed CO2 incubator, or in the view port of a small single use bioreactor.

A still further object, feature, or advantage is to provide for optimizing the writing, shape, and sizing of antenna used for reading resonant sensors.

Another object, feature, or advantage is to provide modular antenna heads for use in resonant sensor readers.

Yet another object, feature, or advantage is to provide for multiplexing wireless sensor readers to a hub such as a cellular gateway.

A still further object, feature, or advantage is to relate changes in the resonant frequency and/or magnitude of transmission loss to a physical parameter of interest such as temperature, flow rate, foaming, cell concentration, or other parameter.

Another object, feature, or advantage is to utilize edge computing to provide real-time feedback regarding physical parameters of interest.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, a resonant sensor reader for reading a wireless resonant sensor is provided. The resonant sensor reader includes a housing, a computing device disposed within the housing, a vector network analyzer disposed within the housing and electrically connected to the computing device, and a plurality of reader antennas electrically connected to the vector network analyzer. The vector network analyzer is configured to sweep frequencies over a range of frequencies to acquire signal parameters for the wireless resonant sensor. The computing device is configured to determine changes in resonant frequency of the wireless resonator sensor based on the signal parameters and/or store resulting signal loss data or transmit the signal loss data to a remote location.

According to another aspect, a method for wirelessly reading a resonant sensor includes positioning the resonant sensor reader proximate the resonant sensor, the resonant sensor comprising (a) a housing, (b) a computing device disposed within the housing, (c) a vector network analyzer disposed within the housing and electrically connected to the computing device, and (d) a plurality of reader antennas electrically connected to the vector network analyzer. The method further includes calibrating the resonant sensor reader for reading the resonant sensor, collecting signal parameters over a range of frequencies to provide transmission loss data using the vector network analyzer and the plurality of reader antennas, and determining change in resonant frequency for the resonant sensor from the transmission loss data.

According to another aspect, a system for reading at least one wireless resonant sensor is provided. The system includes a signal parameter measuring device, a reader housing, a computing device electrically connected to the signal parameter measuring device, and a plurality of reader antennas disposed within the reader housing and electrically connected to the signal parameter measuring device, wherein the plurality of reader antennas comprises a first reader antenna for signal output and a second reader antenna for signal input. The signal parameter measuring device is configured to sweep frequencies over a range of frequencies to acquire signal parameters for the wireless resonant sensor. The computing device is configured to determine changes in resonant frequency of the wireless resonator sensor based on the signal parameters. The reader housing may be sized and shaped for placement against a surface of a vessel in which a chemical or biological process is occurring. The system may further include a main housing, the computing device disposed within the main housing. The system may further include a display integrated into the main housing and operatively connected to the computing device and wherein the computing device is configured to display on the display a run-time associated with the chemical or biological process. The system may include a first mode of operation for calibration and a second mode of operation for data collection. The first mode of operation may provide for determining a range of frequencies to scan. For example, when the system is activated the system may calibrate to its surroundings or environment so as to reject background noise and tune to the range of frequencies to scan. One way in which background noise may be removed is by applying one or more filters. In the second mode of operation, data may be collected including signal parameters and this data may then be analyzed using the computing device.

The plurality of reader antennas may have an external grounding point. The computing device may be configured to extract resonant frequency from transmission loss data. The signal parameter measuring device may be a vector network analyzer (VNA). The computing device may be configured to communicate with a plurality of sensor readers and wherein a first of the plurality of the sensor readers comprises the plurality of reader antennas and the signal parameter measuring device. The system may further include a display operatively connected to the computing device and wherein the computing device is configured to display on the display a run-time associated with reactions of each of the plurality of sensor readers.

According to another aspect, a method for wirelessly reading a resonant sensor is provided. The method includes positioning a resonant sensor reader proximate the resonant sensor, the resonant sensor reader including a reader housing, a signal parameter measuring device disposed within the housing and electrically connected to a computing device, and a plurality of reader antennas electrically connected to the signal parameter measuring device. The method may further include calibrating the resonant sensor reader for reading the resonant sensor, collecting signal parameters over a range of frequencies to provide transmission loss data using the signal parameter measuring device and the plurality of reader antennas, and determining at the computing device (edge computing) change in resonant frequency or transmission loss magnitude for the resonant sensor from the transmission loss data acquired using the resonant sensor reader. The system can include a transfer function (calibration curve) that correlates this signal to meaningful physical parameter (actionable data). This can be displayed to user on the screen, via an indicator light, or directly coupled to controller (4-20 mA) The method may further include wirelessly communicating the transmission loss data to a remote location. The resonant sensor may be mounted to a bioreactor and wherein the change in resonant frequency is associated with a biological process occurring within the bioreactor. The computing device may be operatively connected to a display, the display and the computing device integrated into a housing and wherein the computing device is configured for displaying a characteristic of the biological process on the display. The calibrating the resonant sensor reader for reading the resonant sensor may provide for determining the range of frequencies. The calibrating may include applying calibrations from a calibration file accessible by the computing device. The resonant sensor reader may be one of a plurality of resonant sensor readers and wherein the computing device is operatively connected to each of the plurality of resonant sensor readers.

According to another aspect, a system for reading a wireless resonant sensor associated with a vessel in which a biological or chemical process is occurring, the system may include a computing device, a resonant sensor reader housing, a signal parameter measuring device disposed within the resonant sensor reader housing and electrically connected to the computing device, and a plurality of reader antennas electrically connected to the signal parameter measuring device and disposed within the resonant sensor reader housing. The signal parameter measuring device may be configured to sweep frequencies over a range of frequencies to acquire signal parameters for the wireless resonant sensor. The computing device may be configured to store the signal parameters within a memory. The system may further include a display operatively connected to the computing device and wherein the computer device is configured to display on the display a characteristic of the biological or chemical process occurring within the vessel.

BRIEF DESCRIPTION OF THE DRAWINGS

Illustrated embodiments of the disclosure are described in detail below with reference to the attached drawing figures, which are incorporated by reference herein.

DETAILED DESCRIPTION

The present invention allows one to interrogate the changing resonant frequency or transmission loss magnitude of a resonant sensor and save this data locally onboard a resonant sensor reader or wirelessly share for real time analysis. Resonant sensors may also be known as LC sensors, LC tank sensors, and chipless RFID.

It is to be understood that the resonant sensors may be used for any number of applications. Generally, the examples provided herein describe an example for monitoring cell growth such as may be associated with bioreactors, however the systems, methods, and apparatus described herein may be used in any number of other applications. The resonant sensor used may be associated with a sticker such as available from Skroot Laboratories, and/or that disclosed in U.S. Published Patent Application No. 2020/0129085.

Figure 1:
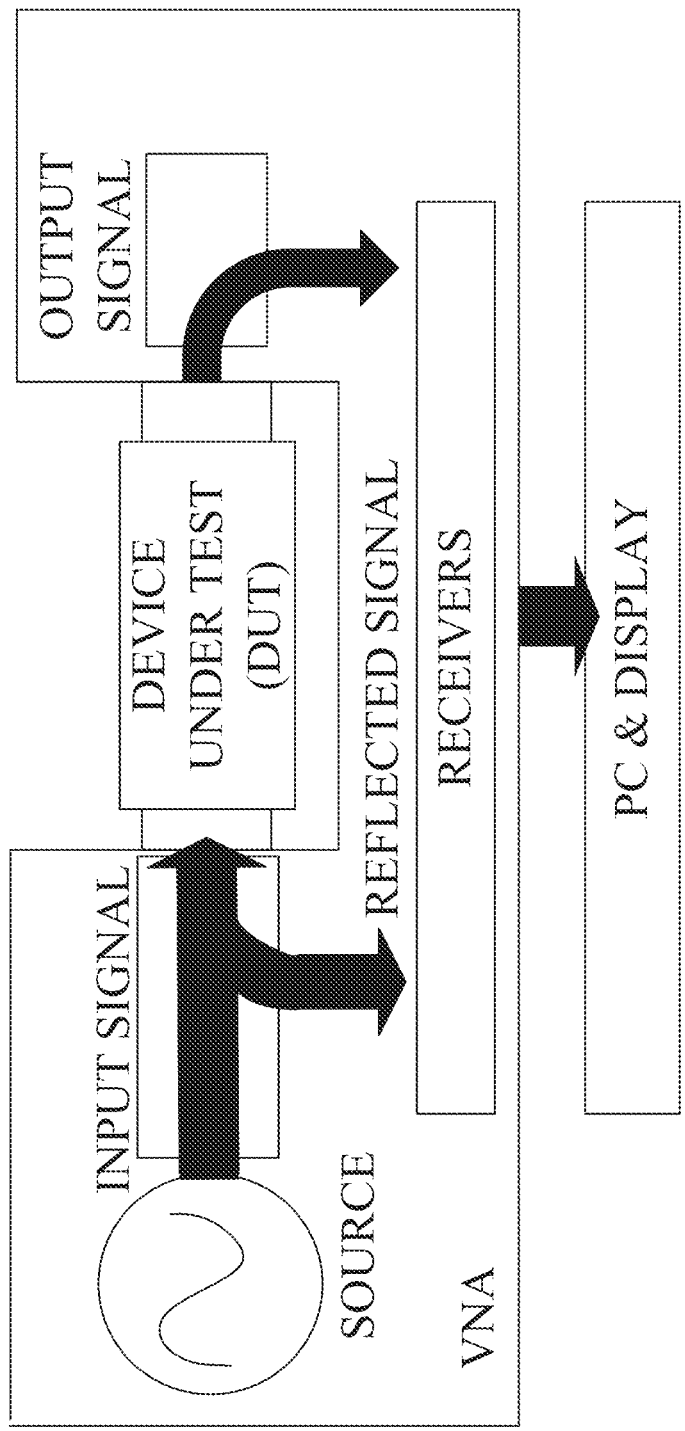
FIG. 1 is a diagram showing the transmission and reflection signals of a prior art vector network analyzer. Note the requirement for an external PC and display. Also not shown are the need for antennas to wirelessly interrogate device.
Figure 2:
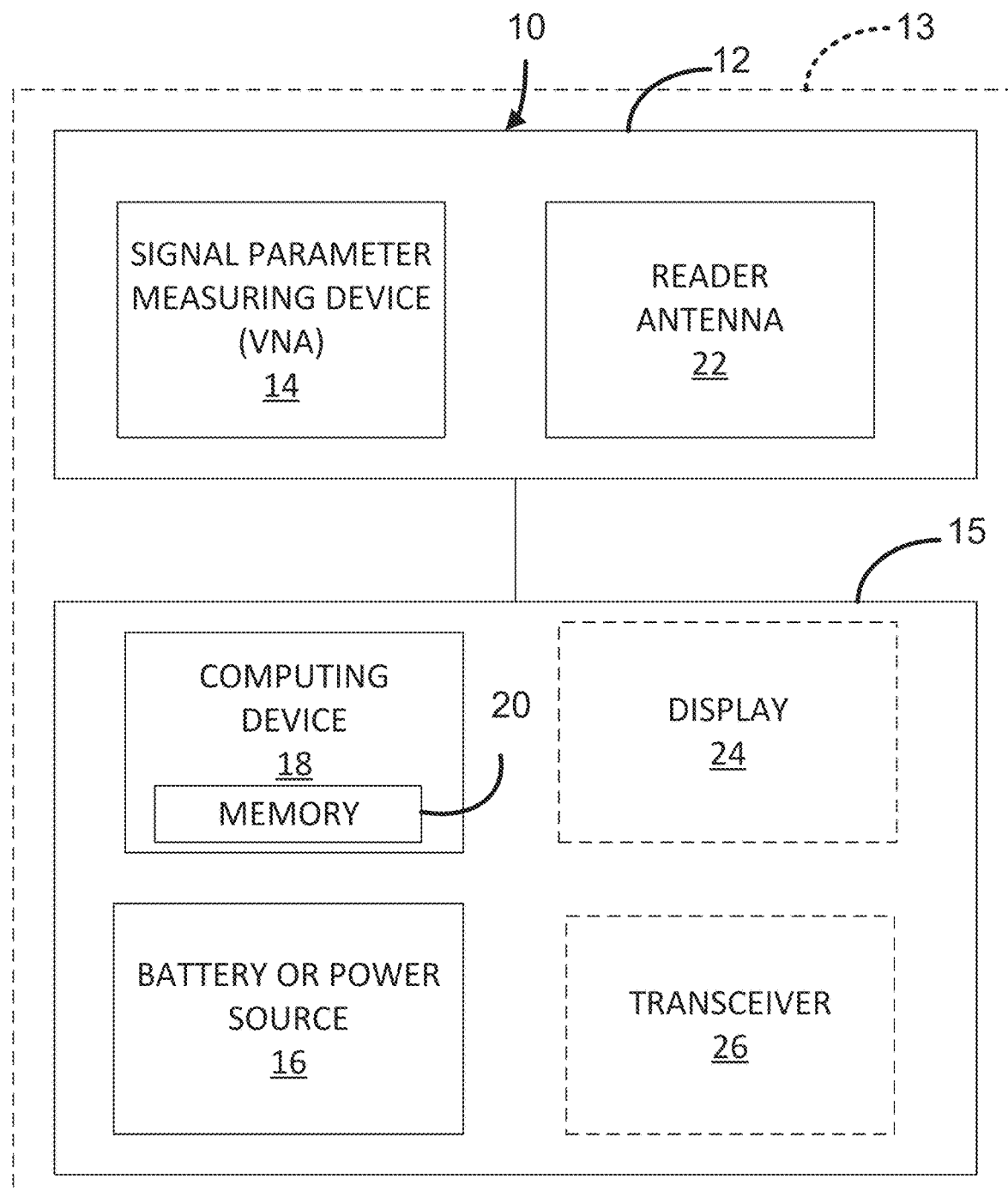
FIG. 2 is a block diagram illustrating one embodiment of a system including a resonant sensor reader.

FIG. 2 illustrates one example of a system with a resonant sensor reader 10. The resonant sensor reader 10 has a housing 12. A plurality of reader antenna 22 are also shown. A signal parameter measuring device such as VNA 14 is shown which may be in the form of a MetroVNA printed circuit board (PCB) available from Metropwr. The MetroVNA PCB contains two signal ports permitting the measurement of the four s-parameters. The PCB may be powered using a NITECORE 3.6 V 2600 mAh rechargeable, Li-ion battery 16 available from SYSMAX Industry Co. This battery design is rechargeable using a standard micro USB cable and a 110 V, 2.4 A charging block. The battery may be placed inside a plastic 18650 battery holder and soldered to the VNA PCB at its power ports. The entire charging system may be self-contained within the shell or housing 12 of the resonant sensor reader 10. Of course, a charging battery is optional and need not be present. For example, the PCB may be powered through its power ports without the battery present. It may, however, be beneficial to include an internal battery for readers that may experience disruption in an external power supply.

Disposed within the housing 15 is a computing device 18 which may be in the form of a single board computer. The computing device 18 may include a memory 20. An optional display 24 and a wireless transceiver 26 are also shown. The reader and the computing device 18 may be operatively connected in various ways. In some embodiments the connection may be in the form of a Universal Serial Bus (USB) connection. In some embodiments, the reader housing 12 and the housing 15 may be integrated into a single housing 13.

The computing device 18 may be programmed with instructions for analyzing signal parameter data to determine changes in resonant frequency and magnitude of transmission loss. A transfer function may be applied to translate changes in resonant frequency or magnitude to a physical parameter of interest such as temperature, cell concentration, gas concentration, or other parameter of interest. One way a transfer function may be applied is using a calibration file which uses data from one or more calibration curves to establish a transfer function between the signal parameter data or the changes in resonant frequency and magnitude of transmission loss and the physical parameter of interest. Of course, the transfer function may otherwise be implemented. The computing device 18 may be considered to provide for edge computing because its analysis is performed at the system as opposed to off-site or at a remote location. This may be advantageous as real-time results of the sensor monitoring may be provided to the user without the need for networking additional computers or other components.

Figure 3:
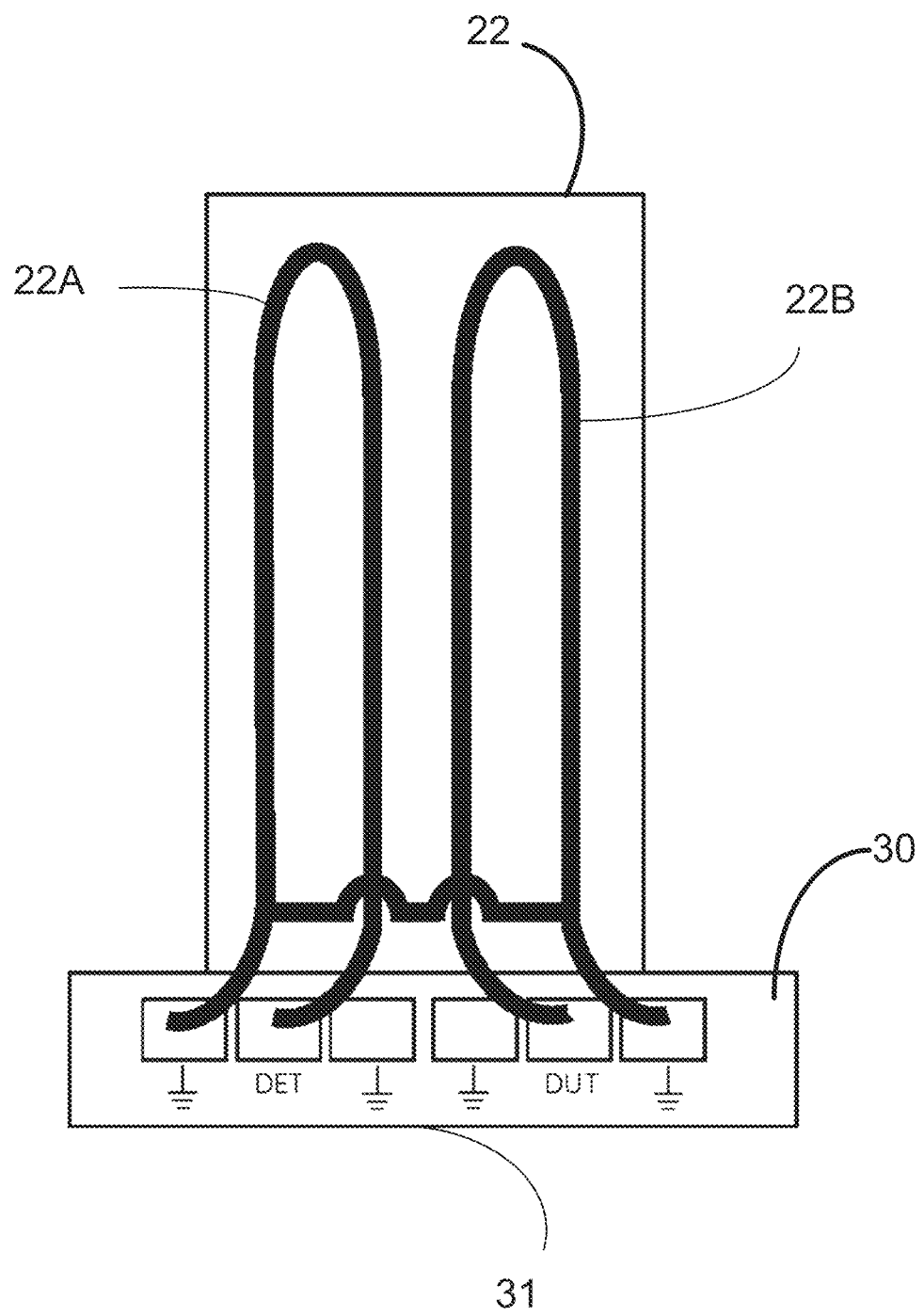
FIG. 3 illustrates a plurality of reader antennas along with wiring diagram for the antenna connections to a signal measuring device such as a VNA PCB. DUT and DET both represent the signal ports while the other contact is a grounding pad.

FIG. 3 illustrates a plurality of reader antennas 22 for the resonant sensor reader. The reader antennas 22 may be optimized for a particular type of resonator. For example, the reader antennas 22 may be optimized reader antennas for spiral Archimedean resonators. Of course, the reader antenna may be adapted or optimized for other resonant sensor geometries.

The plurality of reader antennas 22 for the resonant sensor reader includes a first antenna 22A and a second antenna 22B. The reader may use two reading antennas optimized for reading a Skroot Resonant sensor sticker (4 cm×1 cm square antenna) or other resonant sensor. Each of the two reading antennas 22A, 22B, is connected to a separate signal port on a printed circuit board (PCB) 30. The antennas 22A, 22B may be constructed using BNTECHGO 18AWG Polyurethane Enameled Copper Magnet Wire or may be otherwise constructed. The two antennas 22A, 22B may be placed adjacent to one another, so the inside loops of the antennas 22A, 22B nearly make contact. The antennas 22A, 22B may be fixed in place using Devcon 2-ton epoxy or otherwise.

The antennas 22A, 22B may be wired to the PCB 30 in such a way that the inner loop of both antennas is soldered to its respective signal port of the PCB 30. To further clarify this design, the left-hand antenna 22A contacts the PCB 30 on the left-most signal port, while the right-hand antenna 22B contacts the PCB 30 on the right-most signal port. The outer loops of the antennas 22A, 22B are soldered to a shared grounding pad 31 on the VNA PCB. Thus, the antennas 22A, 22B have an external grounding point. To reduce signal noise during data collection, the outer loops of the antennas 22A, 22B are also grounded to one another at the base of the antenna loops. An example of a wiring diagram is shown in FIG. 3.

Several antenna designs have been implemented to accommodate various bioreactors and cell growth conditions. The antenna utilized in the first-generation reader was the design with two 1.0 cm wide by 4.0 cm long antennas. The antennas were made of the same 18AWG Magnet wire and placed side by side so the inner antenna loops nearly made contact. The second-generation design required a much smaller window to monitor cell growth, and therefore this design utilized two antennas with a width of 0.3 cm and a length of 4.0 cm. The antennas are still placed adjacent to one another, such that the inner antenna loops are touching in this design. Both designs used epoxy to hold the antenna loops in place and were grounded on the outside antenna loops. Of course, it should be understood that different designs and configurations of antennas are contemplated such as may be appropriate for different applications or environments and it is further contemplated that antennas may be constructed in alternative ways using alternative manufacturing techniques.

Figure 4A:
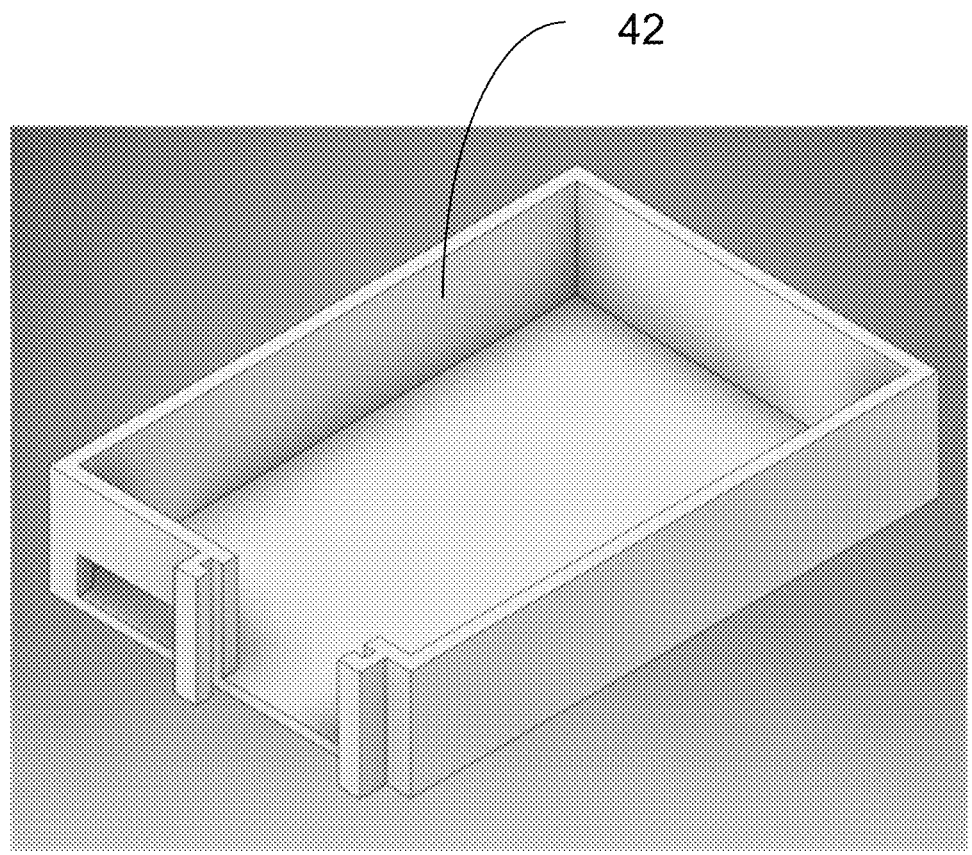
FIG. 4A illustrates one example of a sensor reader shell or sensor reader housing.
Figure 4B:
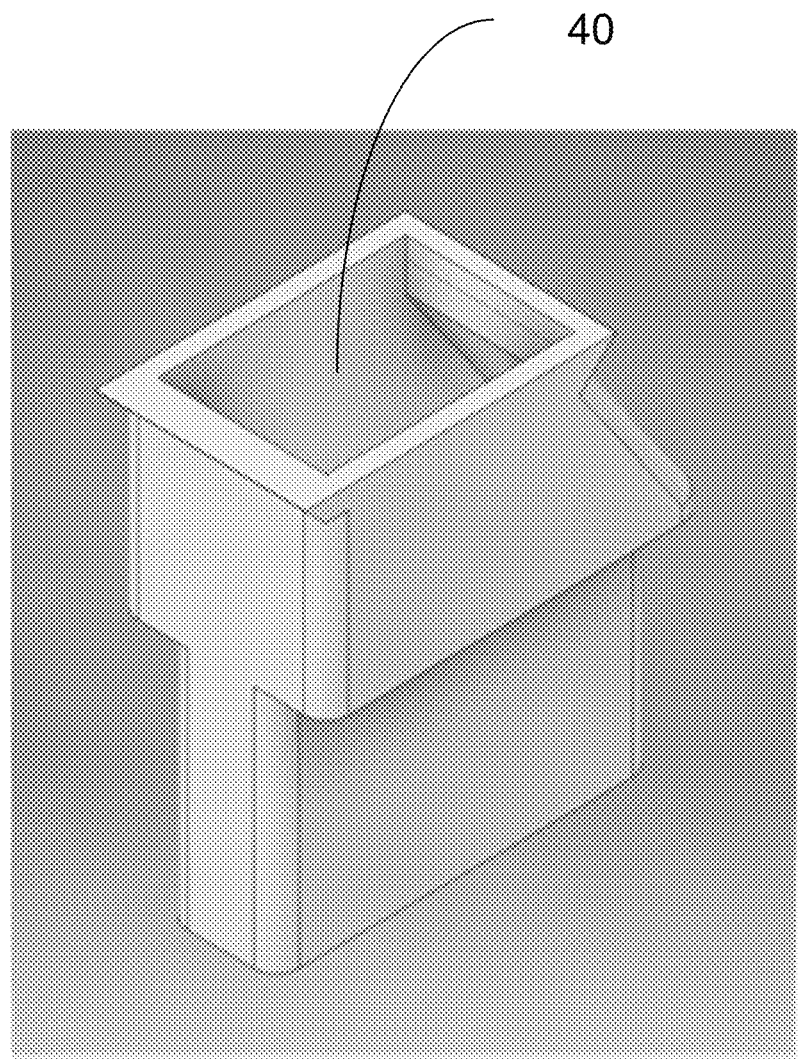
FIG. 4B illustrates one example of a modular antenna head, in this case an antenna head suited for the small window of an AMBR bioreactor (Sartorius).

The shell, lid, and nose piece for reader configurations were designed in Autodesk Inventor 2019 and exported as STL files to be sliced using Ultimaker Cura 4.4 slicing software. The parts were printed on an Ultimaker 2+ 3D printer. Ultimaker Black ABS #1621 plastic filament was used for all parts and was printed at a nozzle temperature 260° C. and a build plate temperature of 80° C. Designed parts are shown in FIG. 4A through FIG. 4E. Of course, other materials may be used and variations in material, size, shape, and configuration are contemplated such as may be appropriate for a particular application or environment. The shell or main housing 42 is shown in FIG. 4A. Note that as shown in FIG. 4B, the modular antenna head portion 40 of the housing or nose piece is sized, shaped, and configured for use in a particular application, in this instance the modular antenna head is sized, shaped, and configured for use with a small window of an AMBR reactor available from Sartorius AG. To run the reader prototype, a Raspberry Pi 3B+ single board computer was used, running a Raspbian, Linux operating system. Python was installed on all Raspberry Pi devices, a code was developed to collect data 'headless' (no external monitor) from the VNA PCB, and a second code was developed to analyze the data and find the resonant frequency. Of course, any number of other types of computing devices running any number of other types of operating systems may be used to run any number of other types of software.

Figure 4C:
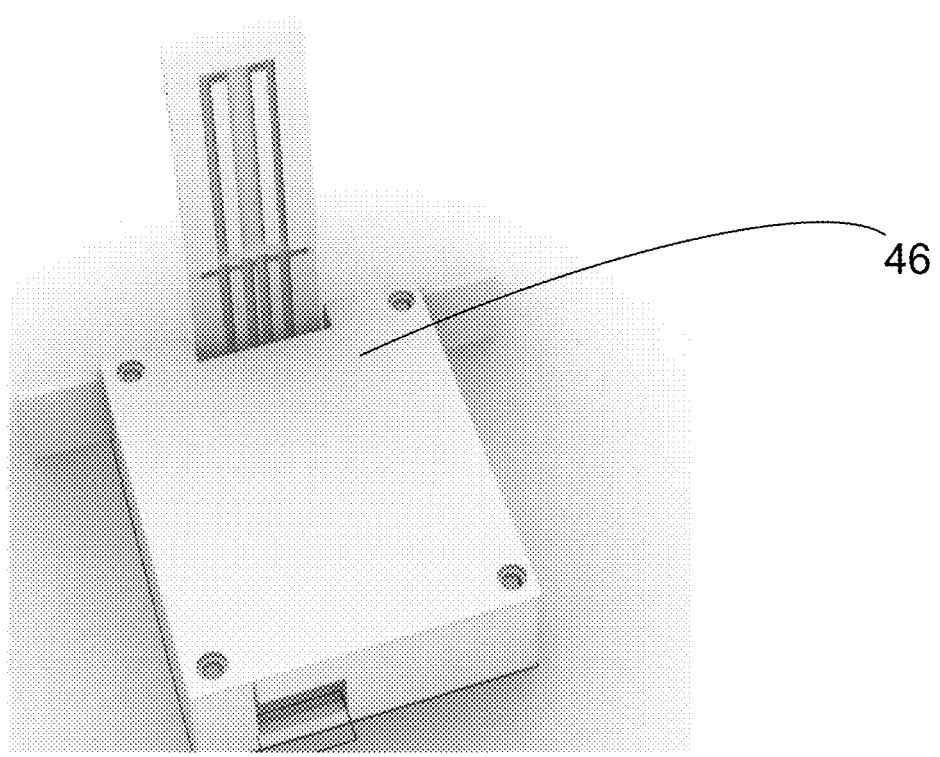
FIG. 4C illustrates one example of a reader housing for a shake flask modular antenna.
Figure 4D:
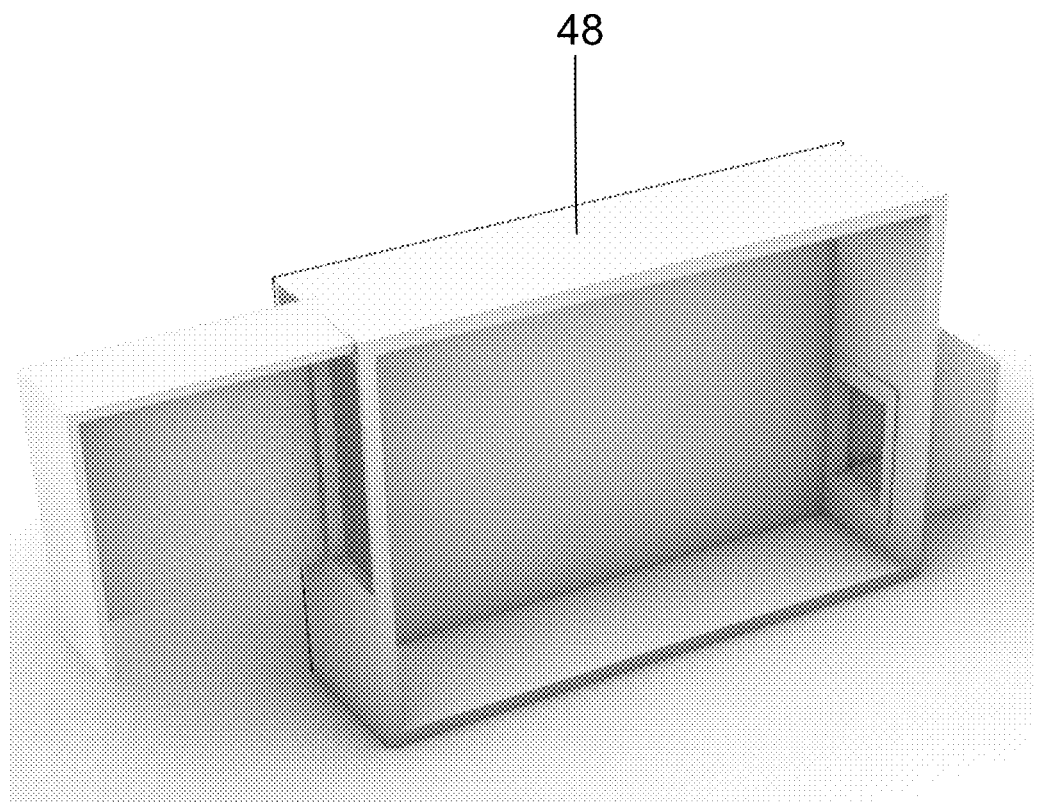
FIG. 4D illustrates one example of a reader housing for a bioreactor modular antenna.
Figure 4E:
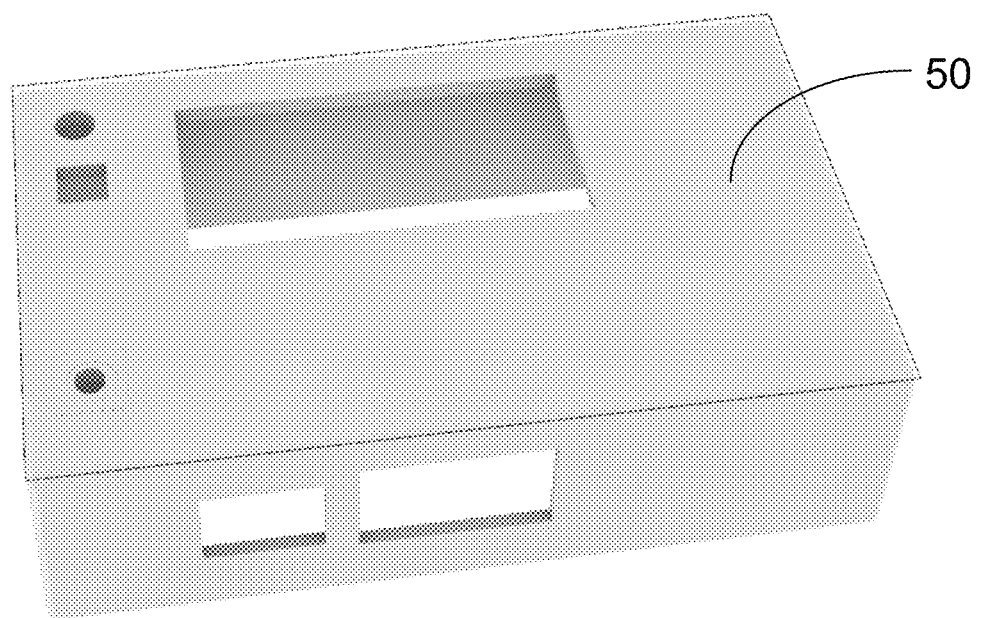
FIG. 4E illustrates one example of a housing for a single board computer having a display.

FIG. 4C provides another configuration for a reader. The configuration shown in FIG. 4C is a housing 46 for a shake flask modular antenna. In such a configuration a shake flask may be placed on the housing 46 with the sensor of the flask adjacent the antennas of the reader. FIG. 4D illustrates another configuration for a bioreactor modular antenna with a reader housing 48. FIG. 4E illustrates a single board computer housing 50. The various styles and configurations of housings shown are representative. It is to be understood that numerous variations and alternatives are contemplated. It is to be further noted that the various sensor reader housings should be sized and shaped so as to position the plurality of antennas proximate or adjacent the sensors associated with the vessels. This may, for example, be underneath the vessel or on the side of the vessel or otherwise.

Figure 5:
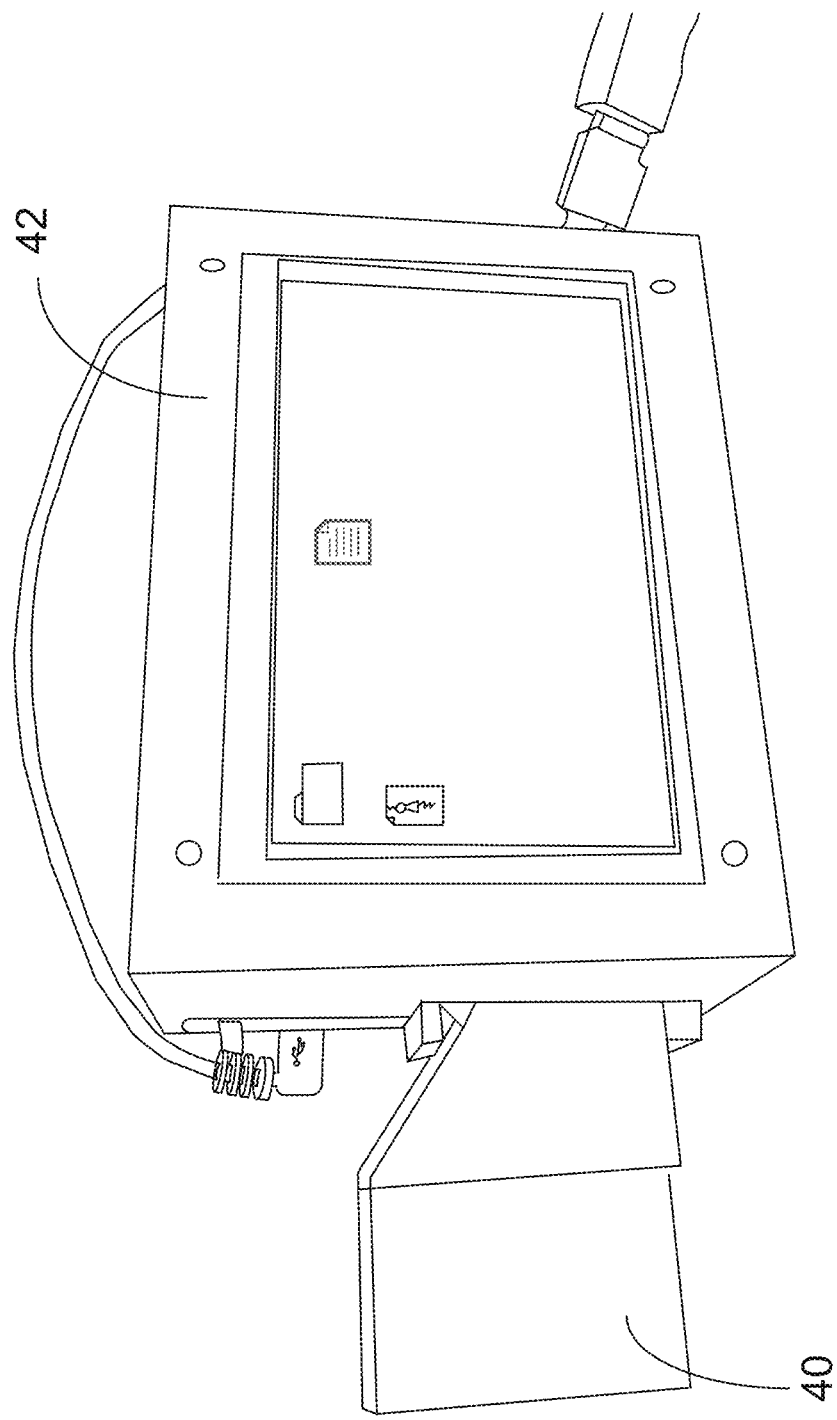
FIG. 5 illustrates a design variant incorporating a 5-inch LCD touch screen.

Another reader design incorporates a 5-inch HDMI TFT LCD Touch Screen that allows all operations, data collection, and data analysis to be displayed on the screen and be carried out using the provided touch pen stylus. The Python code developed for this reader design prompts the user to take calibration traces, check for proper resonant sensor placement, and to begin data collection. The incorporated 5-inch LCD touch screen can be seen in FIG. 5. In FIG. 5, there is a modular antenna head portion 40 and a shell or main housing 42 which together form an integrated housing.

Both the headless VNA reader and the LCD screen VNA variant have Python code developed to record and save data traces both to the Raspberry Pi's integrated microSD card storage and to two removable USB drives connected to the Raspberry Pi. This program allows users to remove a single USB drive from the Raspberry Pi for mid-run data analysis, while also allowing the system to perform continuous data collection. Once analyzed the USB drive can be replaced and data collection resumes unaffected.

As previously mentioned, several reader variants have been developed for use on multiple growth chambers. These include a reader designed for interfacing with AMBR Microbioreactors (Sartorius). The small viewing window requires a smaller 0.3 cm by 4.0 cm reader antenna which we enclose in a custom nose piece. This reader may use the same power system, the same charging system, and the same MetroVNA PCB as previously described. This design was the first incorporation of the two USB save feature and of the smaller VNA antennas. Note that the housing 12 may include a main housing 42 and a modular head portion 40.

Another example of a reader variant design is for use with large single use bioreactor bags (Thermo Fisher). This design variant may use an adjustable-angle, horizontal arm to hold the reader in place on the front of the metal frame, a vertical arm used to adjust reader elevation, and an angle-adjustable, sliding arm used to fine tune antenna placement on the resonant sensors). This system uses a headless Raspberry Pi with a standard MetroVNA PCB. The antennas utilized were the standard 1.0 cm by 4.0 cm and positioned adjacent to one another.

Another design variant incorporates the previously mentioned Raspberry Pi 5-inch HDMI TFT LCD Touch Screen. The variant was developed for use with AMBR reactors. Instead of operating the system headless, using the momentary push button switch and LEDs, the system was operated using the LCD screen and stylus. Due to the newly implemented LCD screen, data may be analyzed and viewed in real time. This design retained the two USB save feature, the same MetroVNA PCB, the same nose piece or modular head portion, and the same antennas, from the previous AMBR model.

Figure 6:
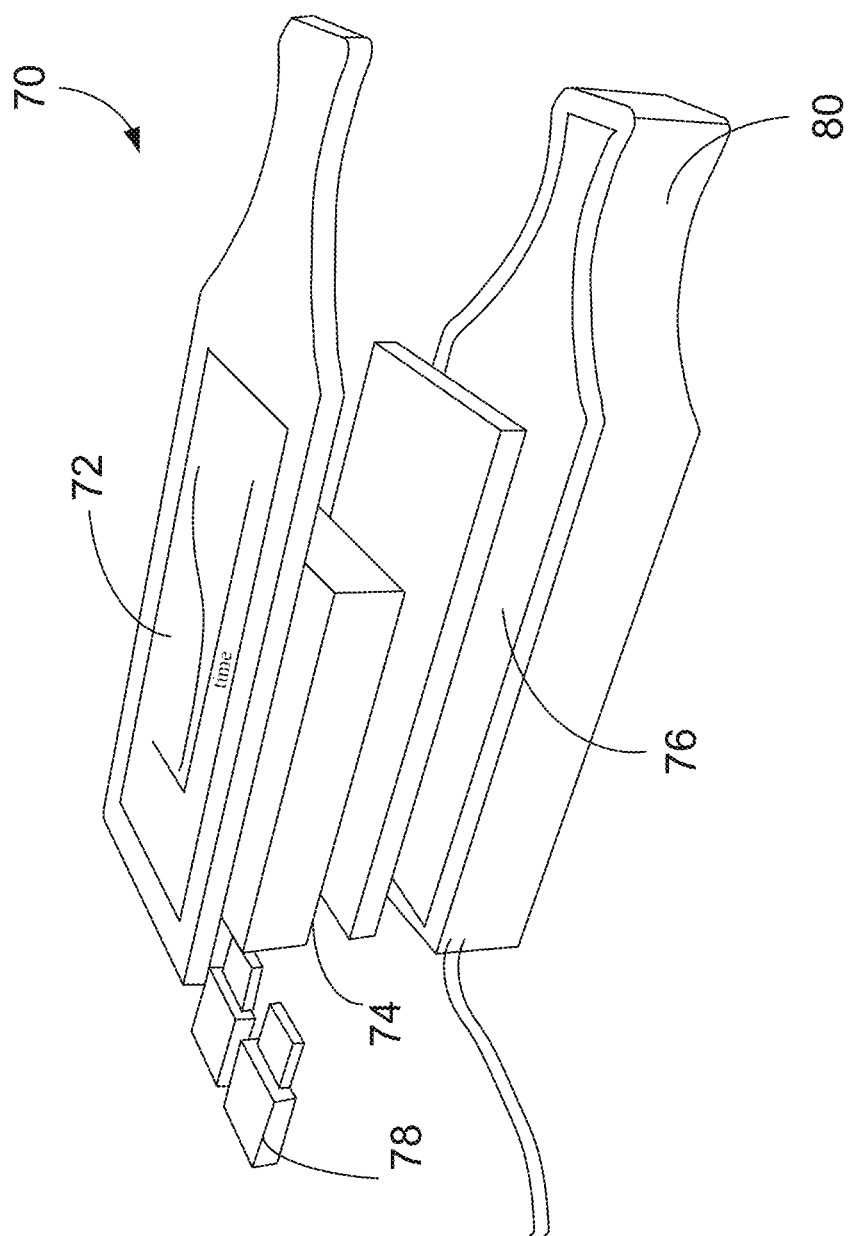
FIG. 6 illustrates a sub-assembly parts of invention and on-going improvements. 1) housing for smaller MetroVNA PCB and other components, 2) integrated single board computer, 3) integrated display, 4) dual saving, and 5) modular antenna head.

FIG. 6 is perspective view showing another embodiment of a system 70. As shown in FIG. 6, a modular antenna head 80 is shown which is integrated with a housing 76. A VNA PCB or other signal parameter measuring device may be positioned within the housing 76 along with a computing device 74 such as an integrated single board computer. One or more external drives 78 are also shown as well as an integrated display 72. Although various examples of modular heads have been shown and described herein, it is to be understood that variations in size, shape, and geometry may be made in order to accommodate different bioreactor form factors. It is to be understood that different sized and shaped modular heads may be designed for different bioreactor form factors. This may include sizing and shaping the housing for the sensor reader so as to be proximate to the resonant sensor. It is contemplated that the wireless resonant sensor may be integrated into various types of bioreactors including flasks, single-use bags, and bioreactors with windows. In addition, various forms of wireless communication may be incorporated into the sensor reader. For example, a cellular transceiver such as a 4G or 5G transceiver may be incorporated into the sensor reader to send data to the cloud. In one embodiment, a simple 'plug-and-play' approach may be used where there is no need for manual calibration or data observation; instead, the sensor reader may be placed in proximity to the resonant sensor, plugged in and then data may then be sent to the cloud. It is also contemplated that component parts may be further reduced in size and power consumption may be further reduced so that there is not a need for any internal auxiliary battery.

Figure 7:
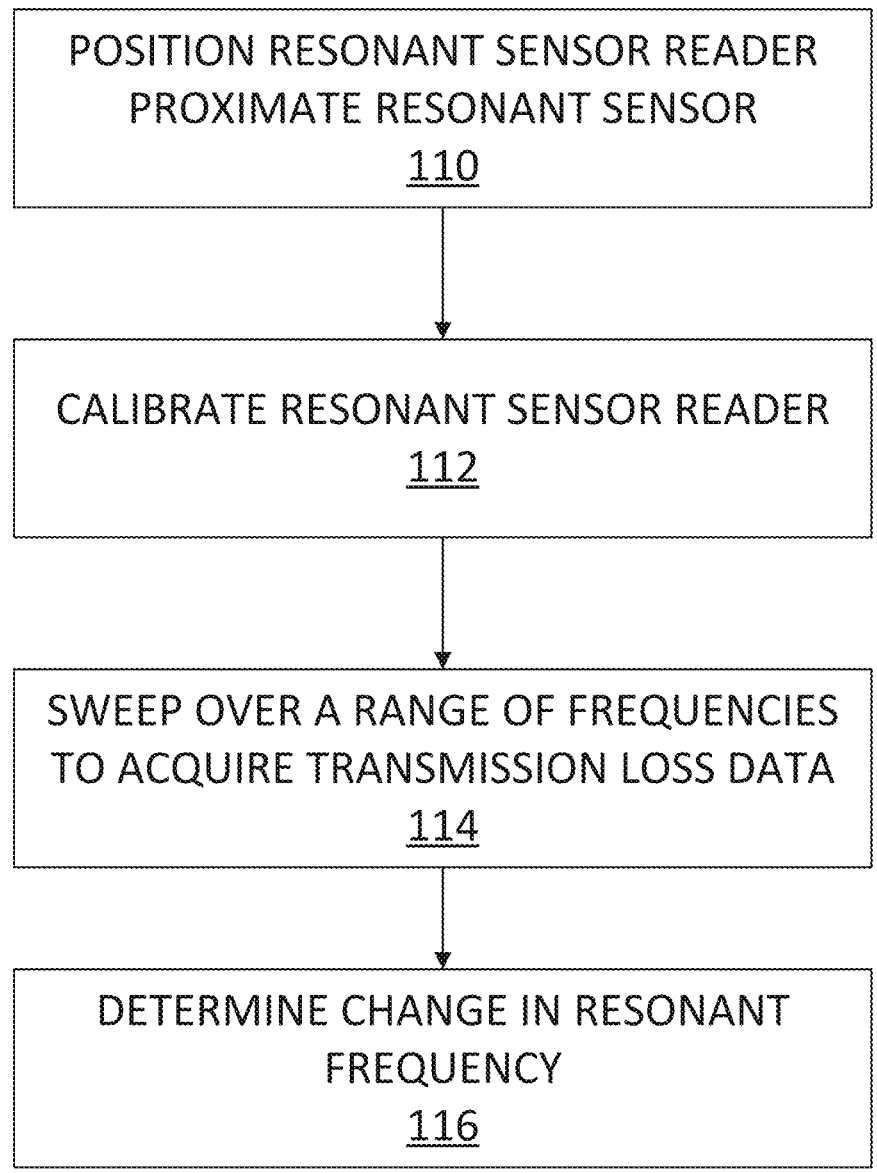
FIG. 7 is a flow diagram illustrating one example of a process for wirelessly reading a resonant sensor.

FIG. 7 illustrates one example of a method for using the resonant sensor reader. In step 110, the resonant sensor reader may be placed on or proximate to a resonant sensor. The resonant sensor reader may be turned on, allowing it to auto-calibrate as shown in step 112. Next, in step 114, the resonant sensor reader may acquire and save the resonant frequencies of the sensor to hard drive, external drive, or cloud drive (depending on hardware options). The signal parameter measuring device such as a VNA sweeps frequencies over a specified range (typically 1-180 MHz) saving the S21 scattering parameters, or power transmitted through the resonant sensor. The resonant frequency (lowest point of the S21 curve) may then be identified via algorithm as shown in step 116.

Figure 8:
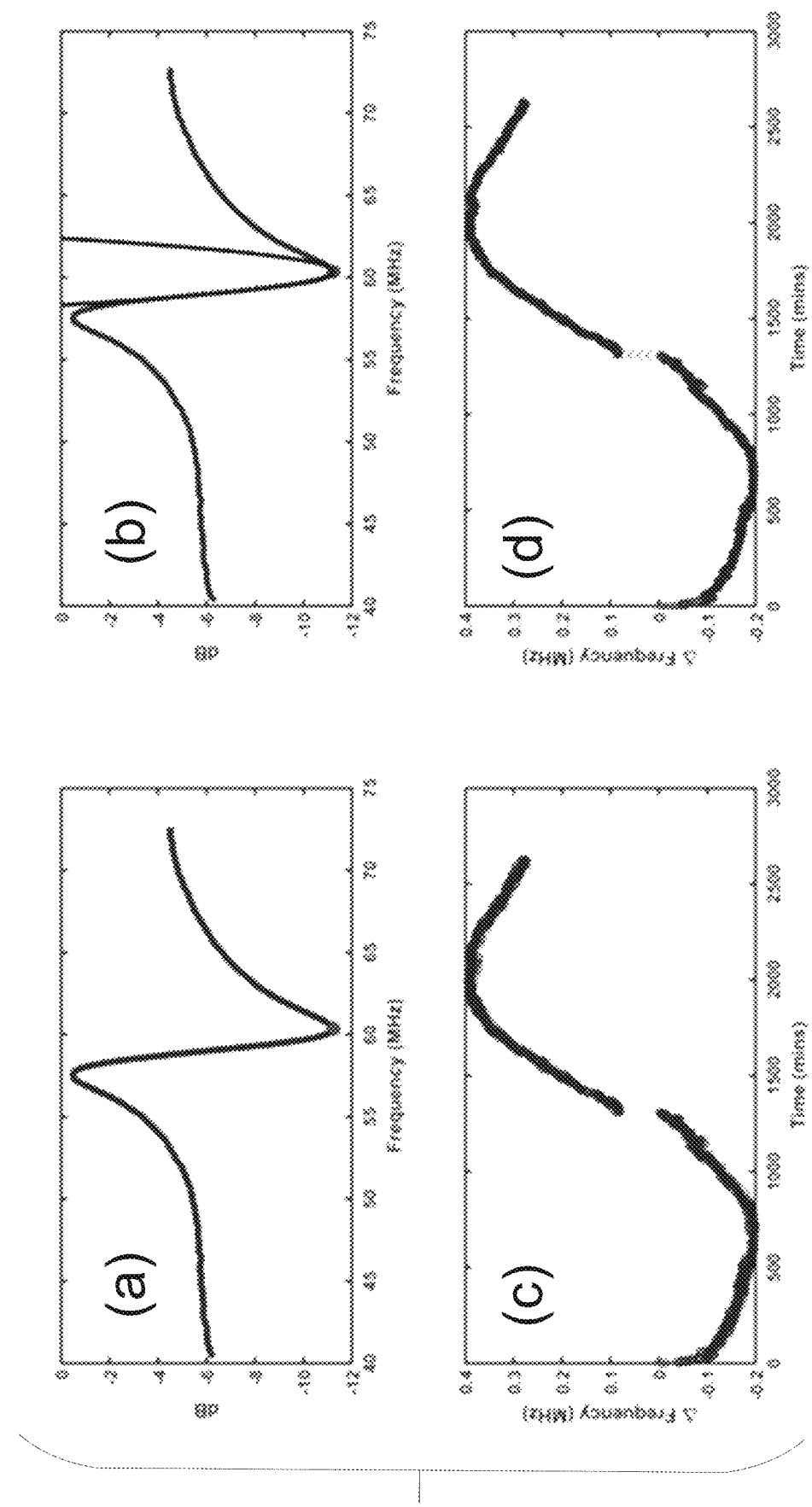
FIG. 8 illustrates results from a series of steps of a python-implemented algorithm used to post-process the transmission loss data. a) minimum point of resonant peak identified, b) quadratic function fit to local region and interpolated minimum found, c) raw min peak vs. time showing some measurement noise, d) min peak vs. time with time-averaged smoothing (10 min window).

FIG. 8 illustrates one example of how post-processing of transmission loss data may be performed via an algorithm. The computing device of the resonant sensor reader may be used to perform the processing onboard or alternatively, the data may be communicated to a remote location for post-processing. The algorithm for post-processing may be implemented in various ways including through use of python or other programming languages.

For example, resonant frequency may be extracted from the transmission loss data by first identifying the transmission peak minimum as shown in panel a of FIG. 8. The algorithm may then fit a quadratic function over a number of data points (e.g. 40 points) centered around the frequency minimum in order to interpolate the frequency at the absolute minimum. This avoids banding of data with lower precision analog-to-digital converters. Results of such a step are shown in panel b of FIG. 8. Next, the calculated resonant frequency may be subtracted from the starting resonant frequency in order to report a change in resonant frequency as shown in panel c of FIG. 8. Finally, a moving window average (e.g. 10 points) may be used to minimize measurement system noise as shown in panel d of FIG. 8. It is to be understood that varying number of points may be used as may be appropriate in a particular application or environment. It is to be further understood that alternative methods to reduce system noise may be used.

It should be understood that the change in resonant frequency of the resonator may be related to other data as may be appropriate in the particular application or environment. For example, where the resonant sensor is being used with a bioreactor, the change in resonant frequency may be used to determine cell growth or cell concentration. Of course, the change in resonant frequency of the resonant sensor may be used in numerous other applications including those illustrated in FIG. 9 to FIG. 11.

Figure 9:
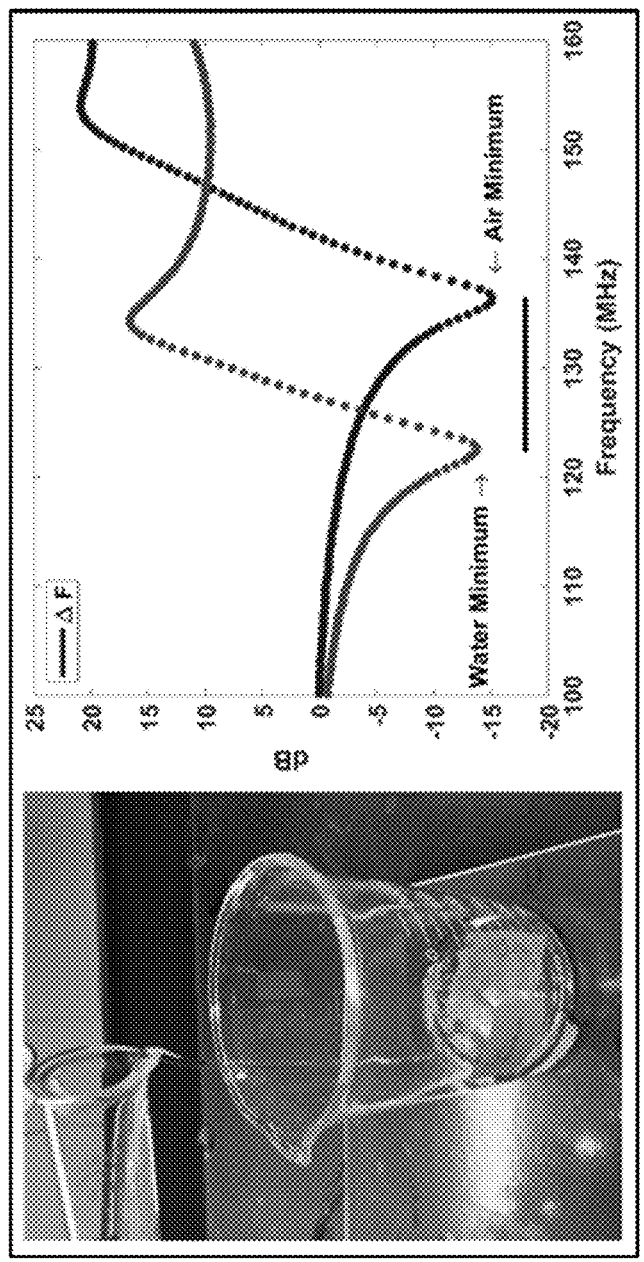
FIG. 9 illustrates a resonant sensor used to detect hydration event. The resonant sensor which in this example is incorporated into a sticker is placed below a vessel, water is added and the change in local dielectric shifts the resonant frequency lower. This is detected using the resonant sensor reader.

In FIG. 9 a resonant sensor is used to detect a hydration event. In this example, the resonant sensor is incorporated into a sticker placed below a vessel, water is added and the change in local dielectric shifts the resonant frequency lower. This change in resonant frequency is detected using the resonant sensor reader.

Figure 10:
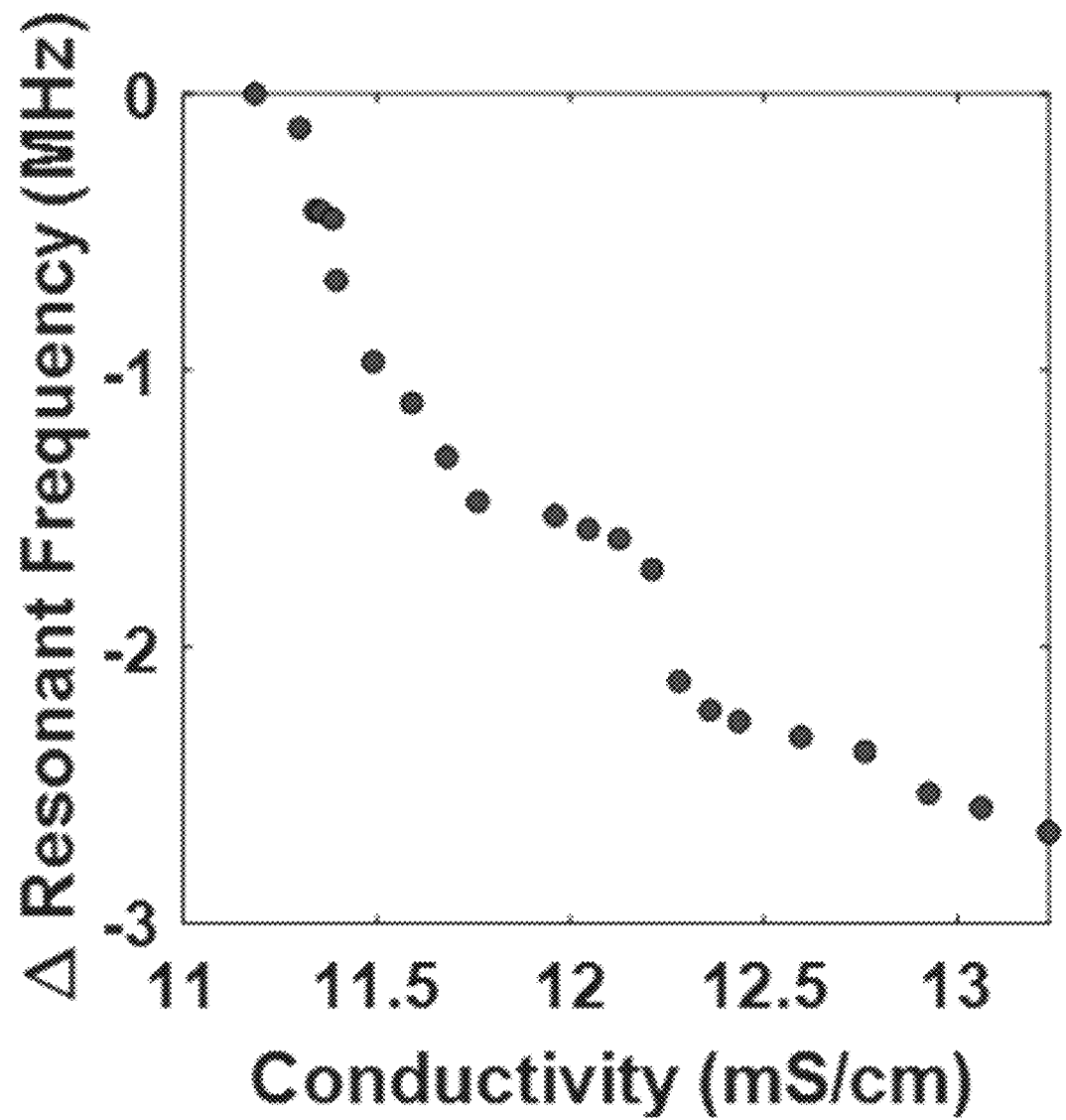
FIG. 10 illustrates an example of a resonant sensor measuring conductivity changes in an ionic solution.

FIG. 10 illustrates an example of a resonant sensor measuring conductivity changes in an ionic solution. In this example resonant sensors were used to measure changes in conductivity in a solution of sodium chloride. Aliquots of increasing volume of salt solution were added to a beaker of distilled water. Aliquots were added at 25 microliter increments until a volume of 100 uL was added. Then the aliquots were increased to 100 microliters until 1300 microliters of salt solution was added. Conductivity measurements were taken after each aliquot was added and the solution was mixed for 10 seconds.

Figure 11:
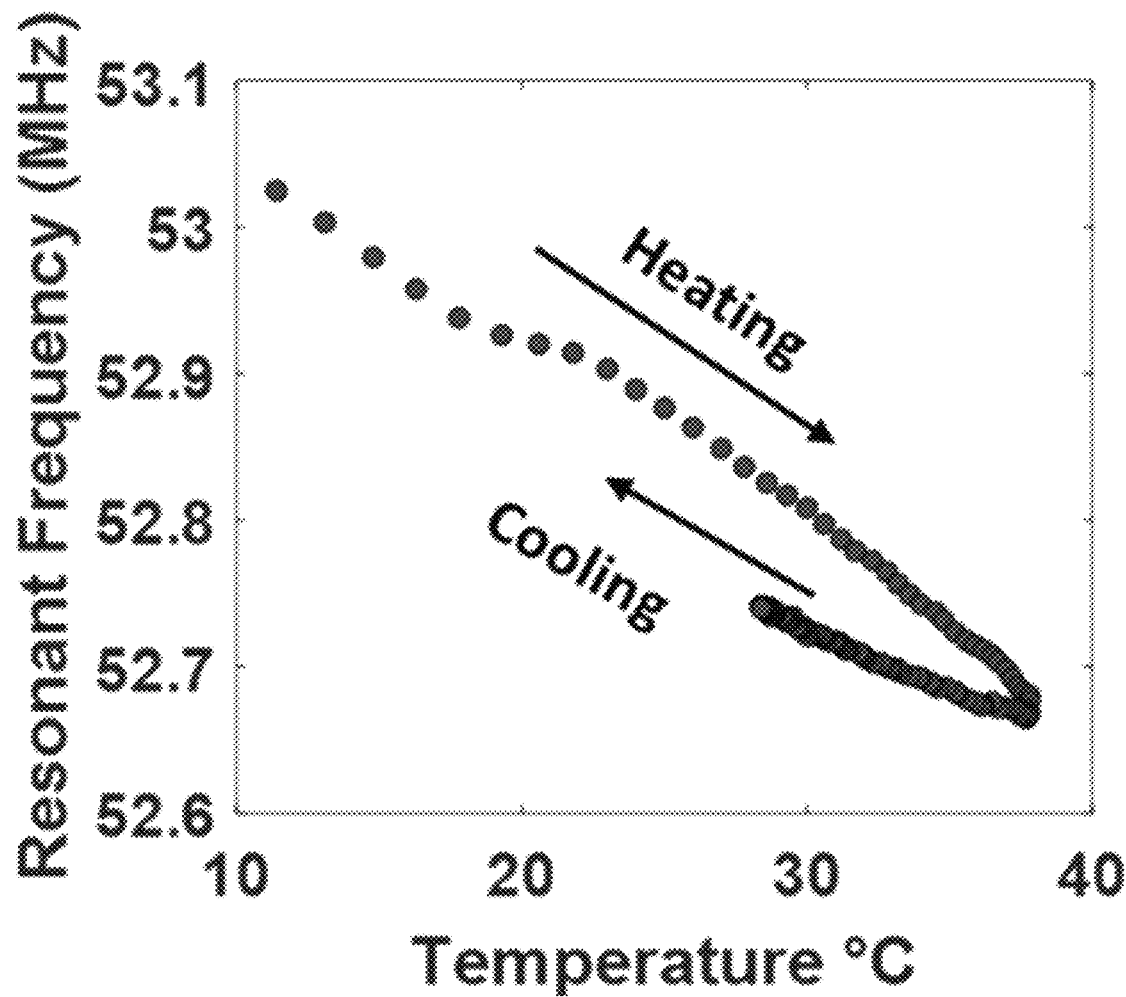
FIG. 11 illustrates an example of a resonant sensor measuring changes in solution temperature.

FIG. 11 illustrates an example of a resonant sensor measuring changes in solution temperature. In particular, here a 250 mL beaker was filled with refrigerated Lysogeny broth (LB) media and placed inside a shaker incubator for heating. A wired thermocouple was placed inside the LB media to record solution temperature. Shaking was applied at 90 RPMs to ensure a uniform media temperature. The media was heated to 40 degrees Celsius and then allowed to cool to near-room temperature.

In operation, a transfer function (such as may be provided by a calibration file) may be used to translate change in resonant frequency or magnitude or other data based on the acquired signal parameters to physical parameters of interest such as, but not limited to, cell growth, cell concentration. Signal data may also provide dip amplitude and dip frequency, or any other information which one skilled in the art may determine based on the provided signal parameters.

Figure 12:
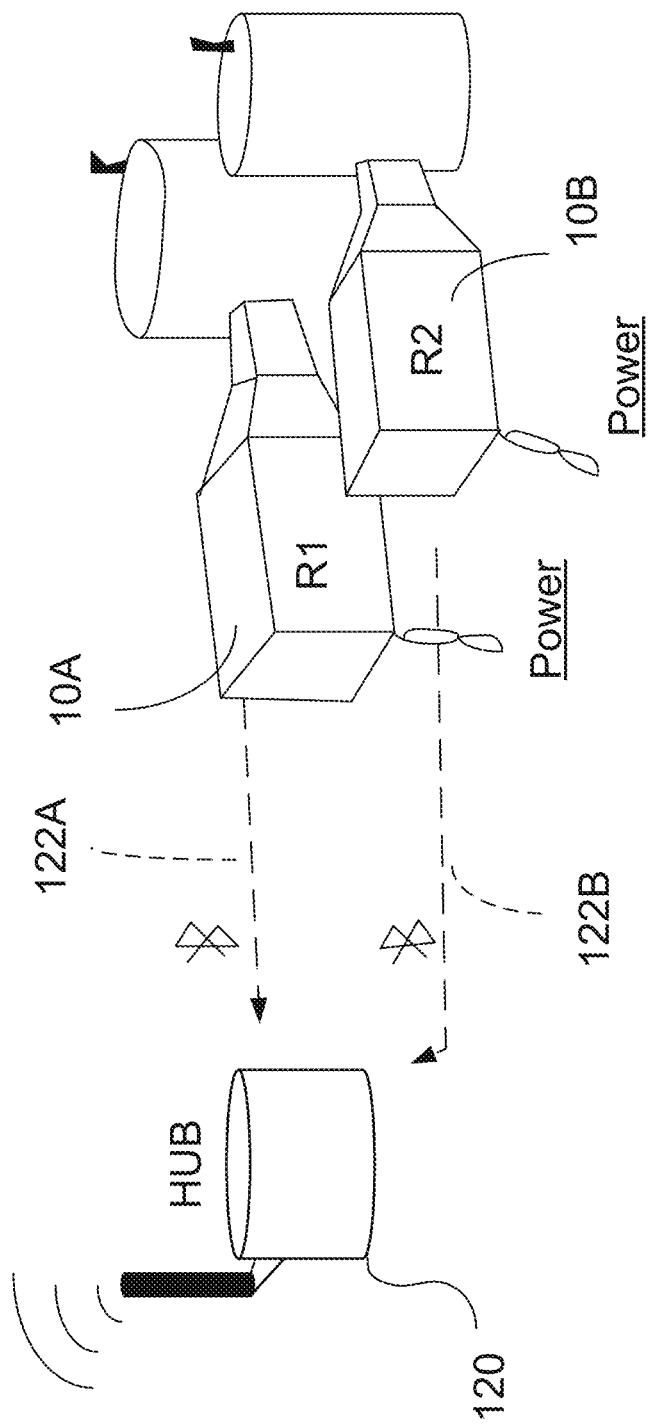
FIG. 12 illustrates an examples of readers which have been multiplexed via a Bluetooth connection to a cellular hub.

The present invention also contemplates that multiple resonant sensor readers may be used and resulting data, such as resonant frequency, may be communicated to a remote device or location using a hub. FIG. 12 illustrates an examples of resonant sensor readers 10A, 10B which have been multiplexed via a Bluetooth connection to a cellular hub such as a 4G hub or a 5G hub or other hub 120. In this embodiment, the transmission loss data is captured and interpreted by the resonant sensor readers and only the resonant frequency for each reader need be transmitted to the wireless hub using signals 122A, 122B. Backwards time average smoothing may be applied to reduce sensor noise. The hub may then transmit the data via a subscriber identify module (SIM) card and cellular network to a server. The data may then be presented on a secure web page or other cloud-based system and be accessible by the customer or other user having access to the data. Thus, various types of processes may be monitored remotely. The data may consist of raw scattering parameter curves or the analyzed results of resonant frequency and transmission loss magnitude. Alternatively, an on-board transfer function (such as may be defined using one or more calibration curves) may be used to convert the sensor data to actionable readout of parameter of interest (temperature, ion concentration, cell concentration, etc.).

Figure 13:
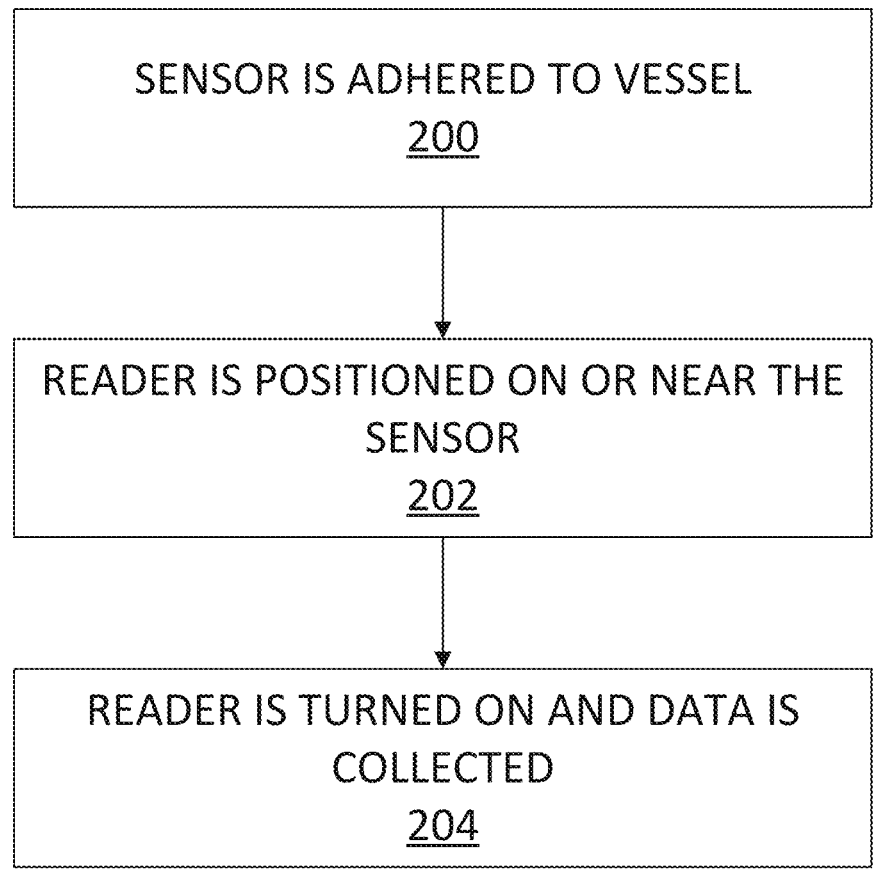
FIG. 13 is a flow diagram illustrating process of initializing reader system with sensor.

FIG. 13 illustrates a process enabled by the resonant sensor reader. In this example each reader has been calibrated based on the attached interrogation antenna. A file containing this calibration is saved and applied by the reader when collecting data via the VNA circuit board or other signal parameter measurement device. This static calibration file enables a simplified operation mode. In operation, in step 200 a sensor is adhered to the vessel. Next in step 202 the reader is positioned at (on or otherwise proximate) the sensor. Then in step 204 the reader is turned on data is collected. The data may be saved locally, streamed to the cloud, wired to a controller, or otherwise stored. Thus, it is to be understood that the present invention contemplates that calibration may be performed in various ways and further contemplates that the end user need not perform the calibration, thereby increasing the convenience and ease of use of the end user and reducing likelihood of improper calibrations.

Figure 14:
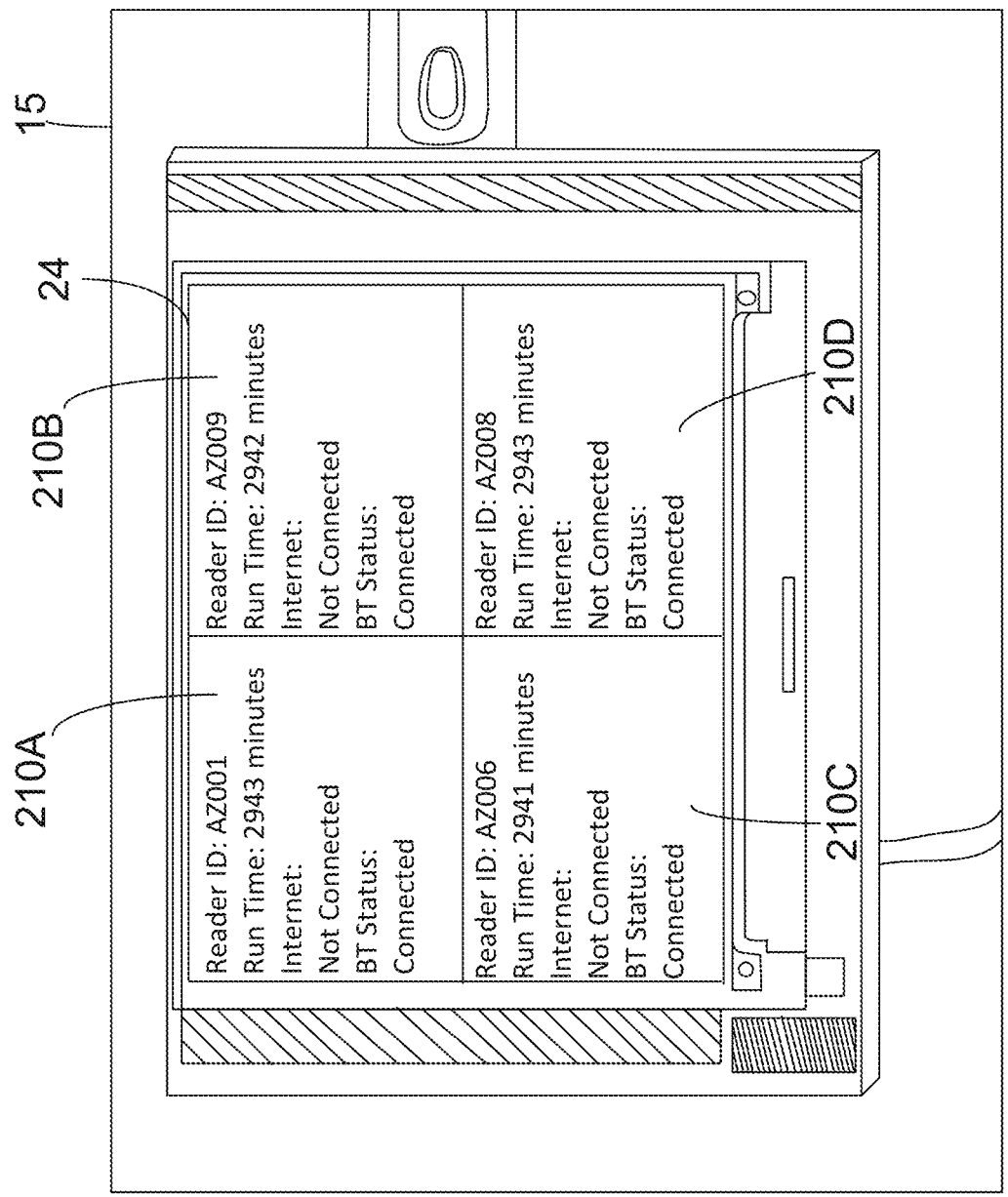
FIG. 14 illustrates a display showing status associated with four different sensor readers.

FIG. 14 illustrates a display showing status associated with four different sensor readers. A housing 15 has a display 24. The computing device disposed within the housing may be configured to display information or characteristics on one or more chemical processes, biological processes, or reactions occurring in an associated vessel. Such information may include, without limitation, an identifier for the reader, the run time for the chemical process or biological process, the status of an internet connection, the status of a Bluetooth connection, or other information. Although status for four different readers are shown in FIG. 14, it is contemplated that information for more or fewer readers may be displayed.

Figure 15:
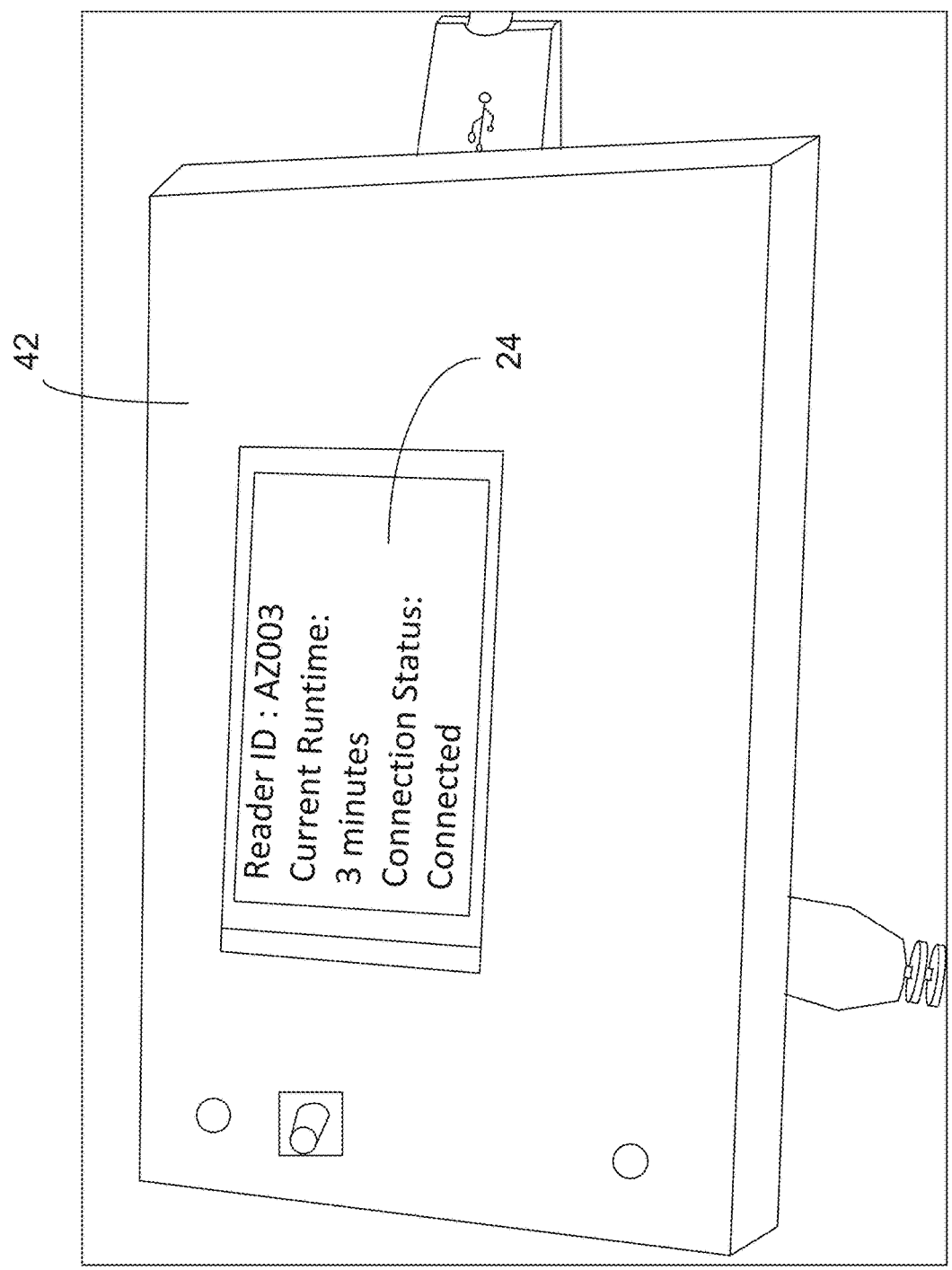
FIG. 15 illustrates a display showing status associated with a sensor reader.

FIG. 15 illustrates a display 24 showing status associated with a housing 42. The computing device disposed within the housing may be configured to display information or characteristics on one or more chemical processes, biological processes, or reactions occurring in an associated vessel. One example of such a characteristic is the run time associated with the process or reaction occurring in an associated vessel or bioreaction chamber. Of course, any number of physical values can be presented on the display 24 where present. Alternatively the physical values may be otherwise communicated to a user. For example, output of the reader may also be communicated to a user using an indicator light or may be directly coupled to a controller (such as using 4-20 mA logic) or otherwise communicated. Therefore, various apparatus, methods, and systems have been disclosed. The invention is not to be limited to the particular embodiments described herein. In particular, the invention contemplates numerous variations in the size, shape, geometry, and configuration of different elements, the functionality provided, the correlations between signal parameter data and physical parameters, the information presented on a display where present, and other options, variations, and alternatives. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

REFERENCES

The following references are hereby incorporated by reference in their entireties.
1. Ong K G, Grimes C A, Robbins C L, Singh R S (2001) Design and application of a wireless, passive, resonant-circuit environmental monitoring sensor. *Sensors and Actuators A: Physical*, 93(1):33-43. https://doi.org/10.1016/S0924-4247(01)00624-0
2. Potyrailo R A (2017) Disposable multivariable sensing devices having radio frequency based sensors. http://www.google.com/patents/US9536122
3. Charkhabi S, Chan Y J, Hwang D-G, Frey S T, Bartlett M D, Reuel N F (2019) Kirigami-Enabled, Passive Resonant Sensors for Wireless Deformation Monitoring. *Advanced Materials Technologies*, 4(5): 1800683. https://doi.org/10.1002/admt.201800683
4. Charkhabi S, Carr A R, Wu J, Roy S, Beierle A M, Thomas D K, Neihart N M, Reuel N F (2019) Resonant Sensor Arrays for Wireless Characterization of Solvated Ions. https://doi.org/10.26434/chemrxiv.9595628.v1
5. Charkhabi S, Beierle A M, McDaniel M D, Reuel N F (2018) Resonant Sensors for Low-Cost, Contact-Free Measurement of Hydrolytic Enzyme Activity in Closed Systems. *ACS Sensors*, 3(8):1489-1498. https://doi.org/10.1021/acssensors.8b00267

What is claimed is:

1. A system for reading at least one wireless resonant sensor, the system comprising:
a signal parameter measuring device;
a reader housing;
a computing device electrically connected to the signal parameter measuring device;
a plurality of reader antennas disposed within the reader housing and electrically connected to the signal parameter measuring device, wherein the plurality of reader antennas comprises a first reader antenna for signal output and a second reader antenna for signal input;
wherein the signal parameter measuring device is configured to sweep frequencies over a range of frequencies to acquire signal parameters for the at least one wireless resonant sensor;
wherein the computing device is configured to determine changes in resonant frequency of the at least one wireless resonator sensor based on the signal parameters and apply a transfer function to one of changes in resonant frequency and changes in transmission loss to determine at least one physical characteristic associated with a chemical or biological process occurring within a vessel associated with the at least one wireless resonant sensor.

2. The system of claim 1 wherein the reader housing is sized and shaped for placement against a surface of a vessel in which a chemical or biological process is occurring.

3. The system of claim 2 further comprising a main housing, the computing device disposed within the main housing.

4. The system of claim 3 further comprising a display integrated into the main housing and operatively connected to the computing device and wherein the computing device is configured to display on the display a run-time associated with the chemical or biological process.

5. The system of claim 1 wherein the system has a first mode of operation for calibration and a second mode of operation for data collection, wherein in the first mode of operation background noise is rejected and a range of frequencies to scan is determined.

6. The system of claim 1 wherein the plurality of reader antennas have an external grounding point.

7. The system of claim 1 wherein the computing device is configured to extract resonant frequency, magnitude of signal loss from transmission loss data or reflection (S21 or S11).

8. The system of claim 7 wherein the computing device is further configured to determine dip frequency and dip magnitude from transmission loss data.

9. The system of claim 1 wherein the signal parameter measuring device is a vector network analyzer (VNA).

10. The system of claim 1 wherein the computing device is configured to communicate with a plurality of sensor readers and wherein a first of the plurality of the sensor readers comprises the plurality of reader antennas and the signal parameter measuring device.

11. The system of claim 10 further comprising a display operatively connected to the computing device and wherein the computing device is configured to display on the display a run-time associated with reactions of each of the plurality of sensor readers.

12. A method for wirelessly reading a resonant sensor associated with a vessel in which a chemical or biological process is occurring, the method comprising:
  positioning a resonant sensor reader proximate the resonant sensor, the resonant sensor reader comprising (a) a reader housing, (b) a signal parameter measuring device disposed within the housing and electrically connected to a computing device, and (d) a plurality of reader antennas electrically connected to the signal parameter measuring device;
  calibrating the resonant sensor reader for reading the resonant sensor by removing background noise;
  collecting signal parameters over a range of frequencies to provide transmission loss data using the signal parameter measuring device and the plurality of reader antennas;
  determining at the computing device change in resonant frequency or transmission loss magnitude for the resonant sensor from the transmission loss data acquired using the resonant sensor reader;
  applying at the computing device a transfer function to correlate at least one of change in resonant frequency or changes in transmission loss to determine at least one physical characteristic associated with the chemical or biological process occurring within the vessel associated with the resonant sensor.

13. The method of claim 12 further comprising wirelessly communicating the transmission loss data or edge computed transfer function results to a remote location.

14. The method of claim 12 wherein the resonant sensor is mounted to a bioreactor and wherein the change in resonant frequency is associated with a biological process occurring within the bioreactor.

15. The method of claim 14 wherein the computing device is operatively connected to a display, the display and the computing device integrated into a housing and wherein the computing device is configured for displaying a characteristic of the biological process on the display.

16. The method of claim 12 wherein the calibrating the resonant sensor reader for reading the resonant sensor provides for determining the range of frequencies.

17. The method of claim 12 wherein the resonant sensor reader is one of a plurality of resonant sensor readers and wherein the computing device is operatively connected to each of the plurality of resonant sensor readers.

18. A system for reading a wireless resonant sensor associated with a vessel in which a biological or chemical process is occurring, the system comprising:
  a computing device;
  a resonant sensor reader housing;
  a signal parameter measuring device disposed within the resonant sensor reader housing and electrically connected to the computing device;
  a plurality of reader antennas electrically connected to the signal parameter measuring device and disposed within the resonant sensor reader housing;
  wherein the signal parameter measuring device is configured to sweep frequencies over a range of frequencies to acquire signal parameters for the wireless resonant sensor;
  wherein the computing device is configured to store the signal parameters within a memory;
  wherein the computing device is configured to determine changes in resonant frequency based on the signal parameters and apply a transfer function to one of changes in resonant frequency and changes in transmission loss to determine at least one physical characteristic associated with the biological or chemical process occurring within the vessel.

19. The system of claim 18 further comprising a display operatively connected to the computing device and wherein the computing device is configured to display on the display a characteristic of the biological or chemical process occurring within the vessel.

* * * * *